Nov. 10, 1942. M. TURCHAN Re. 22,222

FOLLOWER MACHINE

Original Filed July 20, 1934 3 Sheets-Sheet 1

INVENTOR.
Manuel Turchan

BY

Swan, Frye & Nardesty
ATTORNEYS.

Nov. 10, 1942. M. TURCHAN Re. 22,222

FOLLOWER MACHINE

Original Filed July 20, 1934 3 Sheets-Sheet 2

INVENTOR.
Manuel Turchan
BY
Swan, Fryer & Hardesty
ATTORNEYS.

Nov. 10, 1942. M. TURCHAN Re. 22,222

FOLLOWER MACHINE

Original Filed July 20, 1934 3 Sheets-Sheet 3

INVENTOR.
Manuel Turchan
BY
Swan, Fuge & Hardesty
ATTORNEYS.

Reissued Nov. 10, 1942

Re. 22,222

UNITED STATES PATENT OFFICE 22,222

FOLLOWER MACHINE

Manuel Turchan, Dearborn, Mich.

Original No. 2,130,109, dated September 13, 1938, Serial No. 736,207, July 20, 1934. Application for reissue August 5, 1940, Serial No. 351,541

6 Claims. (Cl. 90—62)

The present invention relates to so-called "follower" or "profiling machines"; that is, machines for reproducing, usually in metal, the contour of a previously prepared model of any suitable material. In known machines of the sort indicated profiling has been more or less successfully accomplished but except in certain very expensive and complicated types of machines, accuracy of dimensions has been sacrificed to obtain cheapness and simplification.

Among the objects of the present invention therefore is a simple and relatively inexpensive machine capable of reproducing in accurate dimensions the form of the model or pattern.

Another object is a machine of the character indicated which is capable of reproductions of the model (for example, dies) requiring a minimum of finishing work in order to be in satisfactory form for further use.

Another object is a machine of the character indicated which, though substantially automatic, shall be instantaneously subject to the control of the operator.

Other objects and advantages will be apparent to those skilled in the art upon reference to the following description and the accompanying drawings in which Fig. 1 is a front elevation with parts in section of a machine embodying the present invention.

As indicated above, the invention involves a machine for reproducing in metal the contours of a prepared model, and the drawings are intended to illustrate a machine set up for the reproduction, as a die, of a molded pattern of a fender of an automobile, the pattern being prepared from plastic material and shaped by hand or in any suitable fashion.

Figure 1:
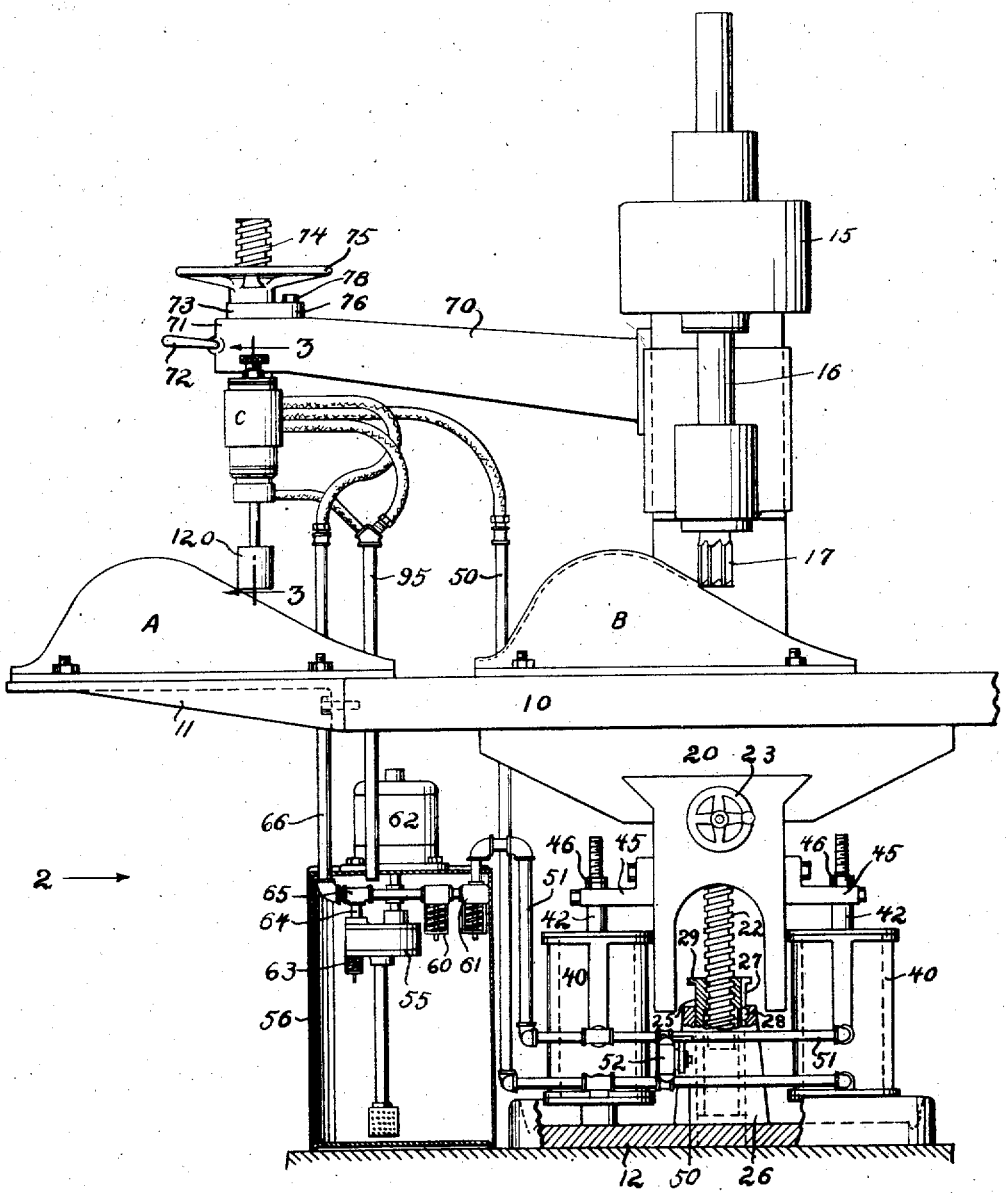

Referring first to Fig. 1, the pattern is indicated at A and the work at B, both secured rigidly to the bed 10 and an extension 11, of the cutting machine, preferably a conventional vertical milling cutter suitably modified. The milling cutter comprises as is usual, a base portion 12 carrying a vertical member 13 within which is housed the working parts operably connected to the driving pulley 14. At the upper end of member 13 is a horizontal portion 15 overhanging bed 10 and supporting the vertical shaft 16 carrying a milling cutter 17. The members 13 and 15 house, as is usual, driving means for the cutter 17 and also are provided with means for vertical adjustment of the latter.

The bed 10 is supported in the usual manner upon a so-called knee 20 and means is provided for moving the bed, in suitable slides, in two directions, i. e., right and left and from front to back and reverse, these moving means being provided with feed screws in the conventional manner.

The knee 20 is also vertically movable in its slide 21, by means of a jack screw 22 operable by a hand wheel 23.

The description so far is of the conventional, well-known vertical milling machine. In preparing the machine for reception of the mechanisms by means of which it is used as above indicated, the only change made is to substitute for the nut, usually cooperating with jack screw 22 an internally threaded sleeve 25 slidable vertically in pedestal 26 and having a keyway 27 cooperating with a key 28 to prevent rotation. The sleeve 25 is also flanged at its upper end 29 to limit its downward movement.

The mechanisms for converting the mill machine consist of fluid operated cylinders for actuating the bed supporting knee 20 vertically, fluid supply means for furnishing fluid under pressure to the cylinders, and control means C for regulating the fluid supply to the cylinders.

The cylinders for actuating the knee are shown in the drawings at 40, being fixed upon the base 12, and are provided with pistons 41 having the piston rods 42 extending through the upper heads 43 through suitable glands 44. These rods 42 are shouldered near their upper ends and cooperate with bracket members 45 fixed to the knee 20, to lift the knee when fluid is forced into the cylinders 40 below pistons 41.

It is preferred to extend the rods 42 some distance above the shoulders to permit, if desired, the addition of sleeves under the brackets 45 to change the relation of the pistons and brackets, and to fix the rods in the brackets by nuts 46 on the upper end of the rods, for a purpose to be explained later.

Leading into the lower ends of cylinders 40 is a fluid supply pipe 50 and leading into the cylinders above pistons 41 is a second fluid supply pipe 51. Connecting these two pipes is a bypass valve 52, normally maintained closed by a spring 53 but operable to open position by a lever or foot pedal 54. The pipes 50 and 51 are supplied with fluid under pressure from a suitable pump 55 drawing the fluid from a tank 56 and delivering to pipe 50 through the control means C, to be described later, and to pipe 51 through a pressure reducing valve 60. Further, pipe 51 is provided with a pressure controlled outlet, valve 61 located between valve 60 and cylinders 40 and inside of, or at least discharging into, tank 56. The pump 55 is preferably operated by a suitable motor 62 and provided with a suitable pressure limiting or safety valve 63. The discharge from pump 55 is through a pipe 64 to a T 65, one branch of which leads to valve 60 and thence to pipe 51, the other branch connecting to a pipe 66 leading to the control device C and thence to pipe 50.

The control device C above referred to is carried at the end of a supporting arm 70 of suitable length, depending upon the size of work, mounted upon upright member 13 and extending laterally. The outer end of arm 70 is provided with a vertically arranged split sleeve 71 fitting within part 73 and having an inside diameter only slightly larger than the outer diameter of the screw 74 which extends up through it and into the interiorly threaded hand wheel 75, the hub of which rests upon the sleeve. As shown best in Fig. 4, sleeve 73 is flanged at its upper end and on one side as at 76 the flange is sufficiently wide and long to allow the formation therein of an arcuate slot 77 which, in cooperation with a screw 78 fixed in arm 70, provides for angular adjustment of the sleeve. Further, the sleeve is provided internally with a slot 80 and the screw 74 with a key way 81 by means of which, with a suitable key the screw may be prevented from turning in the sleeve. The lower end of screw 74 is provided with an enlargement forming a horizontally arranged split sleeve 85 tightened or loosened by a screw 86, and held in this is the side arm 87 of the control device C, about to be described.

Figure 3:
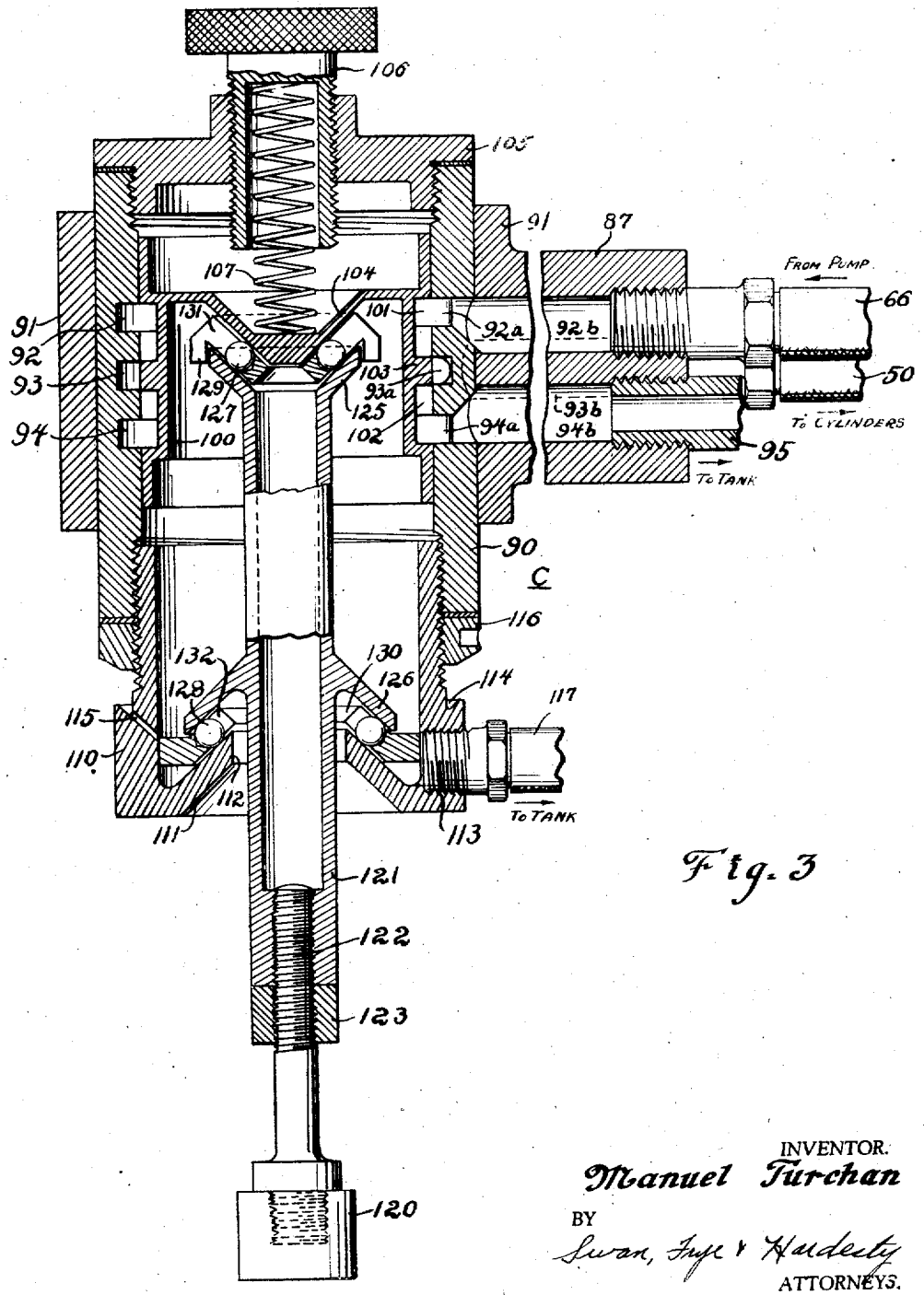
Fig. 3 is a vertical sectional view of the controlling valve on line 3—3 of Fig. 1.

Referring now to Fig. 3 there is shown in section the control device, carrying a pilot or follower for following the outline of the model or pattern to control the movement of the work under the cutter. This device C comprises a preferably cylindrical shell 90 fitting closely in a ring 91 forming a part of the arm 87. This shell has formed in its inner periphery three channels or canals 92, 93, and 94 having ports 92*a*, 93*a*, and 94*a*, which, when the shell 90 and ring 91 are properly relatively located, communicate with three conduits 92*b*, 93*b* and 94*b* extending through arm 87 and connected respectively, through suitable flexible sections to pipe 66, 50, and 95.

Fitting within the shell 90 and slidable longitudinally therein is a valve member 100 having in its outer periphery two grooves 101 and 102 separated by a rib 103 of substantially the width of canal 93. This valve member 100 is open at its bottom but at its upper end is closed and the closure portion provided inside with a small conical projection 104 coaxial with the member.

The upper end of shell 90 is closed by a suitable screw cap 105 having a central threaded opening in which is a screw plug 106, preferably hollow, which cooperates with a spring 107 arranged between it and valve member 100 to provide adjusted spring pressure upon the latter.

The lower end of shell 90 is screw threaded to receive a screw cap 110 having its end dished inwardly to form an inwardly projecting cone 111 and having a concentric opening 112. The cap is also tapped as at 113 to provide for connection with a drain pipe 117. Further, in order to provide for collecting any leakage, between shell 90 and ring 91, the cap is also provided with a small gutter 114 draining through a small opening 115 to the inside. The cap 110 may be fixed in adjusted position by means of a lock nut 116.

The follower or pilot is shown at 120 and this is carried at the lower end of the valve operating member 121 being fixed thereto in any suitable manner as by threading it into the lower end as at 122 using a lock nut 123 if desired. This member 121 comprises a shaft portion extending up through opening 112 to a point closely adjacent the cone 104 of valve member 100. At its upper end this shaft portion is flared conically, as at 125, the angle being the same as that of the cone 104. At an intermediate point on the shaft is formed a conical flange 126 having the same angle as cone 111. It is preferred to make these several cones and flanges with the same angle though a small difference between the angle of cone 104 and cone 111 will not be a serious objection. Further, while an angle of 45° has been found satisfactory, a somewhat smaller or larger angle may be used.

It will be noted that the upper and lower cones are arranged opposite to each other and in order to lessen friction antifriction bearings 127 and 128 are used between the mated conical elements. These bearings comprise balls spaced by cages 129 and 130, respectively, which limits the movement of the balls in only one radial direction, being slotted as at 131 and 132, respectively, to permit the upper ones to move radially outward and the lower ones to move radially inward.

In assembling the control C, the cap 110 is adjusted so that, when pilot 120 is not in contact with anything, valve member 100 is at a position in which the rib 103 will permit communication between grooves 93 and 92, the size of the opening determining the rapidity of action of the cylinders 40.

In preparation for the operation of the machine, a suitable pattern is of course provided and work blank roughly shaped to reduce the amount of cutting is also prepared. These, indicated A and B respectively, are fixed in position upon the bed 10 and extension 11 in substantial alignment and with corresponding points spaced at a distance equal to the distance between the centers of the pilot 120 and the cutter 17. These two elements should be generally the same shape and their size should be the same with the qualification below noted. It is not intended by this statement to mean that the pilot should have cutting teeth. It is preferably smooth with its surfaces of areas corresponding to the planes generated by the outermost portions of the cutter when the latter is rotated. As for the size of the pilot to be used, this is determined by whether the reproduction is to be of the same dimensions as those of the pattern or model. If the pilot is of the exact size of the cutter, the reproduction will be as much smaller than the model as the amount of pilot movement necessary to actuate the valve. This amount will depend upon the valve adjustment and upon the angle of the cones and is of the order of five to fifteen thousandths of an inch. If the pilot is larger by more than this compensating amount, the reproduction will be as much larger than the model. If it is smaller, the work will be smaller.

Figure 4:
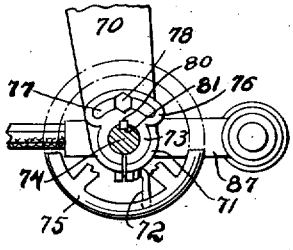
Fig. 4 is a plan view of the valve and support with parts in section and parts omitted for clarity.
Figure 2:
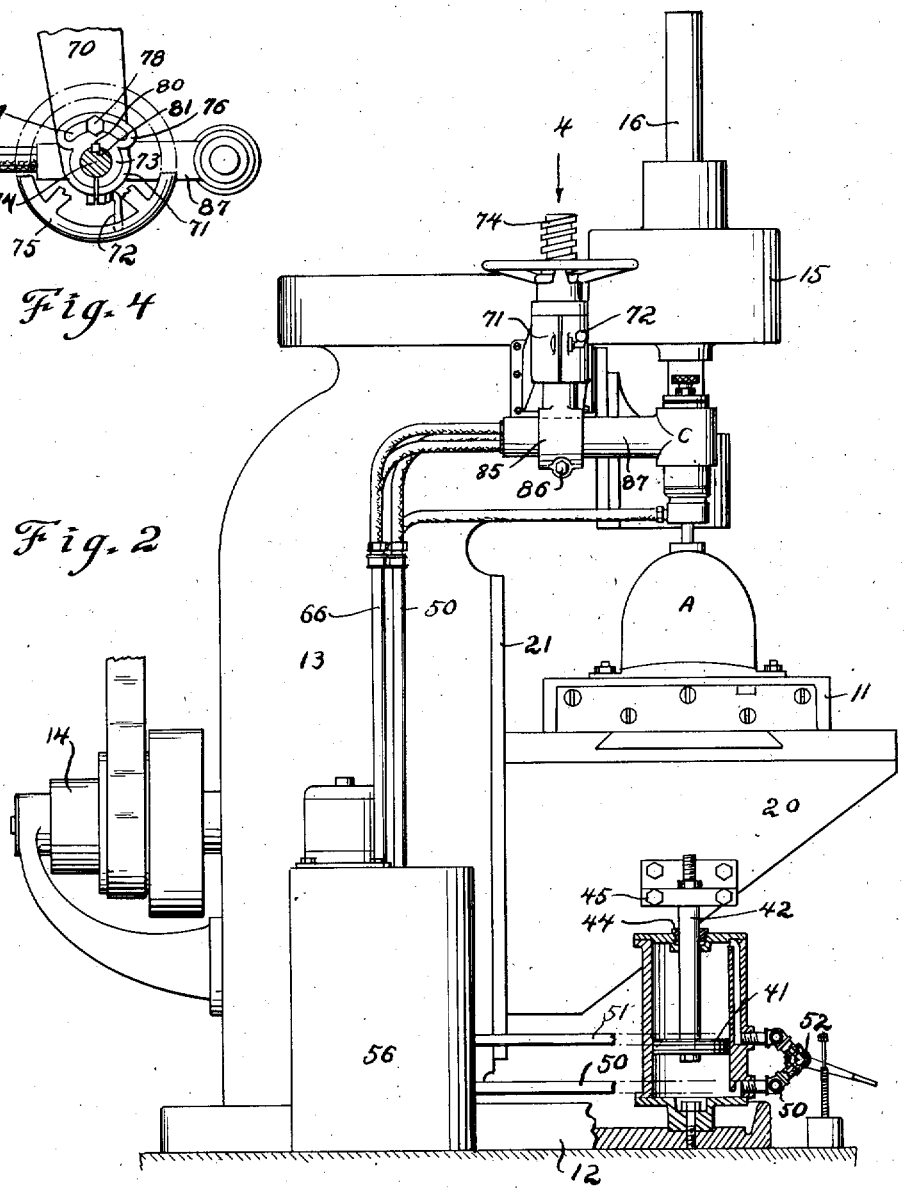
Fig. 2 is a side elevation with parts in section.
Figure 5:
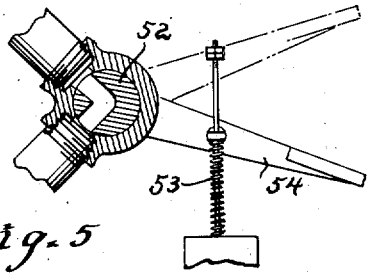
Fig. 5 is a detail in section.

In setting up the pattern and blank, if the size of these requires changing the distance between centers of pilot and cutter, the pilot may be moved toward or away from the cutter by the means shown in Figures 2 and 4. By loosening screws 78 and 86 the arm 87 may be swung about the center of screw 74 and moved lengthwise so as to adjust the position of control C along the center line of bed 10 a number of inches either way from the position shown in Figure 1 in which arm 87 is at right angles to the supporting arm 70.

The vertical adjustment of control C is accomplished by screw 74 and wheel 75 and should be such as to arrange the pilot and cutter at the same level or at such a different level as will correspond to their difference in dimension. The vertical adjustment of the bed 10 and the pieces A and B is accomplished initially by the use of the hand wheel 23 and should be such that the cutter will just pass over the highest point of the blank.

With the pump 55 operating, pressure is developed in pipe 66 and, with the control valve 100 adjusted as above described, fluid will flow into cylinders 40 to raise the bed 10. This will continue until the pilot 120 contacts the pattern. When pressure is exerted on the pilot directly vertical, the valve 100 is of course moved upwardly to shut off communication between passages 92 and 93 and open it between passages 93 and 94. This immediately stops the flow into the cylinders 40 and allows outflow therefrom through pipe 95 to the tank 56. The same action occurs if the pressure on pilot 120 is applied laterally in any direction, as the clearance between the pilot shaft and, of course, any such action will result in an upward movement of the shaft because of the cones 111 and 126 and cones 104 and 125.

In those cases where the pilot engages a very steep upward slope, there may be enough drag downward to center the lower cones. The lateral pressure, however, will cause the valve 100 to be lifted by the action of the upper cones, the stem swinging about the lower cones as a fulcrum.

The feed of the work to the cutter may be automatic or by hand using the feed means commonly provided on milling cutters of the type indicated. Further, if at any time the operator desires to slow the rate of upward movement of the bed 10, he may do so by means of the bypass valve 52, which, when opened, allows more or less of an equalization of pressure in pipes 50 and 51 leading to the cylinders 40 below and above the pistons 41.

While there has been shown means for supplying fluid under lower pressure to the upper side of pistons 41, and while this arrangement is considered desirable as it produces a more prompt response when the pilot indicates downward movement of the bed 10, this is not essential and may be dispensed with, allowing gravity to cause the downward movement.

It will be noted that in the construction set out the high pressure line is positively controlled. The high pressure liquid passes through the pipe 66 into the housing, through the inlet port 92*a*. This high pressure liquid pipe 66 is never brought into communication with the drain port 94*b*. On the high pressure line of the cylinder the liquid under high pressure is positively controlled and must first pass through the housing 90, pass through the port 92*a* and then outwardly through the port 93*a* into the pipe 50. Consequently, there never is a bypassing of the high pressure line through the housing 90, so that this high pressure liquid would be delivered back to the sump or reservoir 56. It will also be noted that liquid is delivered to the cylinder 40 on the upper side of the piston 41 and that this low pressure side of the cylinder is constantly in communication through the low pressure piping 51 with the pump. This dispenses with the need for bleeds and provides a cushion effect which would not be present were low pressure liquid not delivered to the upper end of the cylinder.

In the construction of the valve mechanism shown in Fig. 3 the arrangement is such that a lateral thrust delivered to the tracer spindle is resisted through the engagement of the conical flange 126 with the balls 128. This lateral thrust is, through these inclines 126 and 111 translated into a motion which carries the tracer spindle axially, the balls 128 rolling upwardly between the inclines, the flange 126 riding upwardly on the balls and the balls 128 riding upwardly on the incline 111. This construction has proven quite sensitive to either an axial thrust or a lateral thrust so that a ready and prompt response of the valve to these thrusts is present with a consequent ready response of the cutting tool to the movements of the spindle.

Now having described the invention and the preferred embodiment thereof, it is to be understood that said invention is to be limited, not to the specific details herein set forth, but only by the scope of the claims which follow.

What I claim is:

1. In a profiling machine having a pilot and fluid operated means for moving the work in response to movements of the pilot, fluid control means including a valve device connected to the pilot, said valve device comprising a cylindrical shell, fluid conduits leading thereinto, a valve member in said shell and movable longitudinally therein to control fluid flow through said conduits, an axially located stem extending from said valve member to the exterior of the shell and carrying the pilot, said stem having a conical flange inwardly adjacent the point where it leaves the shell, a mating conical flange on said shell around the opening through which the stem extends, said flanges directed inwardly of the shell and limiting the outward movement of the stem, and said shell flange being of such width as to permit lateral movement of the stem, a socket at the inner end of said stem and a projection on said valve co-operating with said socket.

2. In a profiling machine having a pilot and fluid operated means for moving the work in response to movements of the pilot, fluid control means including a valve device connected to the pilot, said valve device comprising a cylindrical shell, fluid conduits leading thereinto, a valve member in said shell and movable longitudinally therein to control fluid flow through said conduits, an axially located stem extending from said valve member to the exterior of the shell and carryin gthe pilot, said stem having a conical flange inwardly adjacent the point where it leaves the shell, a mating conical flange on said shell around the opening through which the stem extends, said flanges directed inwardly of the shell and limiting the outward movement of the stem, and said shell flange being of such width as to permit lateral movement of the stem, a conical socket at the inner end of said stem, a conical projection on said valve cooperating with said socket, and antifriction means between the opposed faces of the conical elements.

3. In a tracer mechanism of the class described, a valve housing; a valve in said housing slidable to various positions of control; a resilient means for sliding said valve in one direction; a tracer spndle engageable at one end with said valve mechanism and movable longitudinally of said housing; and cooperating conical means on said spindle and said housing, bearing means interposed between said conical means for moving said spindle longitudinally in one direction upon delivery of a lateral thrust to said spindle.

4. In a tracer mechanism of the class described, a valve housing; a slidable valve; a resilient means for sliding said valve in one direction and a tracer spindle engageable at one end on said valve mechanism and adapted, upon axial movement in one direction, for moving said valve in the opposite direction against the pressure of said resilient means; and cooperative conical means arranged on said housing and on said stem intermediate the ends thereof, bearing means interposed between said cooperative means for effecting longitudinal movement of said stem in one direction upon delivery of a lateral thrust thereto.

5. In a tracer mechanism of the class described, a tracer spindle; a valve housing having a slidable valve therein; one end of the spindle projecting inwardly of said housing; a plurality of cooperating inclines associated with said spindle and said housing, bearing means interposed between said inclines for effecting longitudinal movement of the spindle upon delivery of a lateral thrust thereto for moving said valve in one direction; resilient means for moving said valve in the opposite direction, and adjustable means for adjusting the pressure of said resilient means.

6. In a profiling machine, a stem, a shell into which one end of said stem projects, the opening through which said stem extends being sufficiently large to permit lateral movement of the stem; a valve member within said shell and operably engaged by said stem; said stem having a conical flange, a mating conical flange on said shell adjacent the opening through which the stem extends, bearing means interposed between said flanges, whereby said stem is adapted to move longitudinally of said housing upon delivery of a lateral thrust thereto and thereby move said valve, and fluid conduits controlled by said valve.

MANUEL TURCHAN.